US011727404B2

United States Patent
Buradagunta et al.

(10) Patent No.: US 11,727,404 B2
(45) Date of Patent: Aug. 15, 2023

(54) SYSTEMS AND METHODS FOR USE IN NETWORK INTERACTIONS

(71) Applicant: MASTERCARD INTERNATIONAL INCORPORATED, Purchase, NY (US)

(72) Inventors: Sarala Buradagunta, West Orange, NJ (US); Nikhita Patil, Jersey City, NJ (US); Dmytro Kryvoshei, Edison, NJ (US); Shehar Yar, Floral Park, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 17/077,925

(22) Filed: Oct. 22, 2020

(65) Prior Publication Data
US 2021/0125186 A1  Apr. 29, 2021

Related U.S. Application Data

(60) Provisional application No. 62/925,034, filed on Oct. 23, 2019.

(51) Int. Cl.
*G06Q 20/40* (2012.01)
*G06Q 20/20* (2012.01)
*G06Q 20/18* (2012.01)

(52) U.S. Cl.
CPC ....... *G06Q 20/40145* (2013.01); *G06Q 20/18* (2013.01); *G06Q 20/204* (2013.01)

(58) Field of Classification Search
None
See application file for complete search history.

(56) References Cited

U.S. PATENT DOCUMENTS

| 7,464,059 | B1 * | 12/2008 | Robinson | G07G 1/0036 |
| | | | | 713/186 |
| 2011/0314526 | A1 * | 12/2011 | Valentine | H04L 9/3231 |
| | | | | 726/6 |
| 2017/0011384 | A1 * | 1/2017 | Tkachenko | G06Q 30/0237 |

FOREIGN PATENT DOCUMENTS

CN  107146325 A  * 9/2017  ............ G07F 11/002

* cited by examiner

*Primary Examiner* — Nathan A Mitchell
*Assistant Examiner* — Kimberly S. Bursum
(74) *Attorney, Agent, or Firm* — Harness, Dickey & Pierce, P.L.C.

(57) ABSTRACT

Disclosed are exemplary embodiments of systems and methods for facilitating a transaction for the purchase of a product through an unattended vendor. One exemplary method includes capturing a facial image of a user and identifying the user based on the captured facial image. The method then includes compiling a pre-authorization request including credential associated with an account for the user and a first amount and, upon receipt of an approval of the request, manipulating a locking mechanism coupled to a container associated with the unattended vendor to permit access by the user to products included in the container. The method further includes capturing an image of a product removed from the container, identifying the product based on the image, and compiling an authorization request for purchase of the product based on the credential and a second amount associated with the price of the removed product.

20 Claims, 3 Drawing Sheets

SYSTEMS AND METHODS FOR USE IN NETWORK INTERACTIONS

CROSS-REFERENCE TO RELATED APPLICATION

This application claims the benefit of, and priority to, U.S. Provisional Application No. 62/925,034 filed on Oct. 23, 2019. The entire disclosure of the above application is incorporated herein by reference.

FIELD

The present disclosure generally relates to systems and methods for use in facilitating network interactions, with unattended terminals (or terminal devices).

BACKGROUND

This section provides background information related to the present disclosure which is not necessarily prior art.

Users are known to purchases products (e.g., goods, services, etc.) through vendors. It is also known for the vendors to use employees to manage receipt of payment from users for the purchase of such products, and to manage delivery of the purchased products to users when the payment is confirmed. Further, unattended vending machines are sometime used by the vendors at locations where maintaining employees may not be feasible or economical, whereby users can provide a set amount of funds to the vending machines for selected products and the vending machines then dispense the selected products (e.g., beverages, etc.) to the users.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

In purchasing products from vendors, users often present payment cards to the vendors, where the payment cards are then swiped or otherwise tapped to provide payment credentials to the vendors for the users payment accounts (for funding for transactions for the products). Once accepted, attendants at the vendors then deliver the purchased products to the users. It is costly, though, to employ the attendants in order to confirm the transactions and deliver products to users once payment is completed.

Uniquely, the systems and methods herein provide for unattended vendors, whereby recognition of users initiating transactions for selected products may be performed through images associated with the interactions by the user and the resulting transactions. In particular, when a user approaches an unattended vendor, an image (or other biometric) of the user is captured and the user is identified. Once identified, a pre-authorization request for a transaction with the vendor for a selected product(s) is generated and submitted to a payment network. And, upon approval of the request, a container associated with the vendor is automatically made accessible to the user (without interaction from a human attendant associated with the vendor) to permit the user to retrieve the selected product(s) to be purchased. In connection therewith, images of the product(s) are also captured to identity the product(s) and number of product(s). Thereafter, a transaction request for the purchase of the product(s) is submitted, and linked to the pre-authorization request, whereby the user pays for the product(s) removed from the vendor container. In this manner, an unattended vendor may offer products for sale to users, whereby the users, when interacting with the unattended vendor, are identified through biometrics and access to selected products is provided, without prior identification of any specific products to be purchased by the users (e.g., until after the pre-authorization request, etc.).

Figure 1:
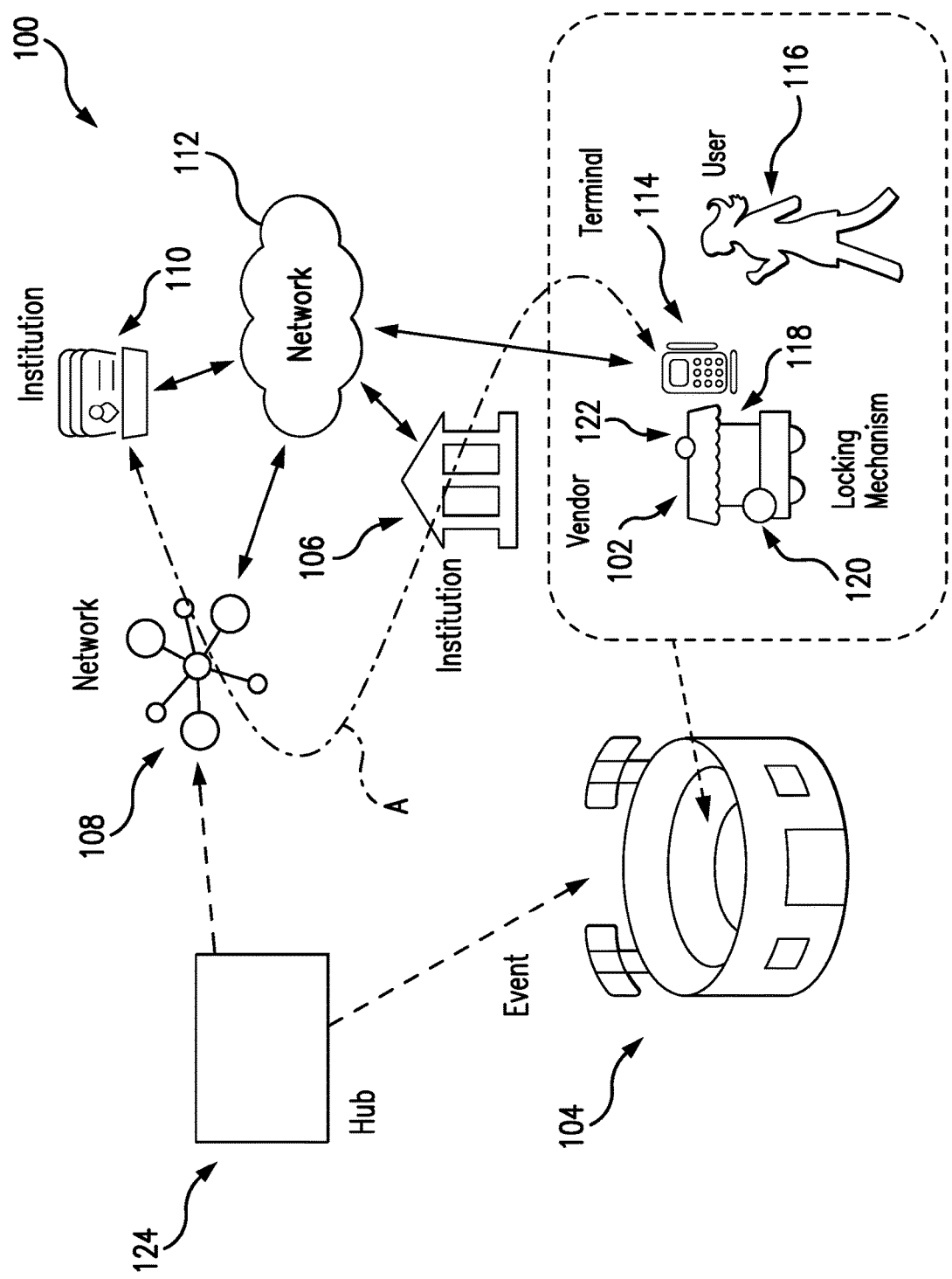
FIG. 1 illustrates an exemplary system of the present disclosure suitable for use in facilitating transactions through unattended vendors.

FIG. 1 illustrates an exemplary system 100, in which one or more aspects of the present disclosure may be implemented. Although, in the described embodiment, the system 100 is presented in one arrangement, other embodiments may include the system 100 arranged otherwise, depending, for example, on processing of transactions, types of unattended vendors implemented in the system, types of vendor containers and/or terminal devices involved in the transactions, types of payment devices used in the transactions, etc.

As shown in FIG. 1, the system 100 generally includes a vendor 102 associated with an event 104, an acquirer institution 106 associated with the vendor 102, a payment network 108, and an issuer institution 110, each coupled to (and in communication with) network 112. The network 112 may include, without limitation, a wired and/or wireless network, a local area network (LAN), a wide area network (WAN) (e.g., the Internet, etc.), a mobile network, and/or another suitable public and/or private network capable of supporting communication among two or more of the illustrated parts of the system 100, or any combination thereof. In one example, the network 112 includes multiple networks, where different ones of the multiple networks are accessible to different ones of the illustrated parts in FIG. 1. For instance, the network 112 may include a private transaction network made accessible by the payment network 108 to the acquirer institution 106 and the issuer institution 110 and, separately, a public network (such as the Internet) through which the vendor 102 communicates with other devices such as, for example, a terminal device 114 (broadly, a terminal) (also referred to as a terminal computing device) associated with the vendor 102, etc.

In the system 100, the vendor 102 offers products (e.g., goods, services, etc.) for sale to users, such as user 116, at the event 104. The event 104 may include a sporting event (e.g., a soccer game, a baseball game, a football game, a hockey game, etc.), a concert, a musical or theatrical performance, a festival, a fair, a carnival, a movie cinema, a seminar, a conference, an exercise facility, or other event in which people attend the event for purpose of education, entertainment, exercise, etc. The event 104 will most often include attendance from a number of users for a defined interval, but may also include a location, such as a shopping mall, a park, etc. where vendors may also be located to offer products for sale. The event 104 may be attended by hundreds or thousands (or more) of users during a time of the event (e.g., during a soccer game, etc.), or potentially a hundred users or less over an extended period of time (e.g., such as a park, etc.). As indicated by the dotted lines in FIG. 1, the vendor 102 is included or disposed at the event 104, for example, which is described as a sporting event at a stadium in this embodiment. It should be appreciated that for a given event, such as event 104, numerous vendors (similar to vendor 102) will be present at the event 104 to offer products for sale.

The vendor 102 includes the terminal device 114, a container 118, a locking mechanism 120 for the container 118 (e.g., to secure the container 118 and products therein, etc.) and at least one camera 122. In particular, the terminal device 114 is configured to initiate pre-authorization and authorization request for transactions involving the vendor 102 by users, via payment accounts associated with the users (e.g., via a payment account associated with the user 116 and issued to the user 116 by the issuer institution 110, etc.). The container 118 is disposed and configured to hold one or more products for sale to users. For example, the container 118 may include a refrigerator having multiple different types of beverages therein, or a warmer configured to hold various food pro and keep the various food products warm, or a combination thereof. While described as food products in this example, the container 118 may be configured to hold various other products in other embodiments (e.g., clothing, electronic devices, etc.). The locking mechanism 120 is coupled to the container 118 and is in communication with the terminal device 114, whereby the locking mechanism 120 is configured to unlock and permit access to the container 118 or to lock and inhibit access to the container 118, generally at the direction of the terminal device 114, etc.

The camera 122 is disposed on or about (or around or in the vicinity of) the container 118, such that the container 118 (or at least a portion of the container 118 or a user interacting with the container 118) is viewable by the camera 122. In particular, the camera 122 is angled and/or positioned to view the user 116, for example, interacting the vendor 102 and the product(s) removed from the container 118. As such, the camera 122 may include a series of cameras (e.g., multiple cameras, etc.), with one of the cameras located at various positions around the vendor 102 to improve the images and/or angle of the images of the user 116 and/or the products, etc. In other embodiments, the vendor 102 may include a biometric reader (e.g., a fingerprint scanner, another biometric reader, etc.), whereby the biometric reader may capture a biometric of the user 116 for use in identifying the user 116 as described herein (e.g., instead of the camera 122, in addition to the camera, etc.).

With continued reference to FIG. 1, the system 100 includes a hub 124, which is configured by executable instruction to operate as described herein. The hub 124 may be a standalone part of the system 100, as generally illustrated in FIG. 1, and is configured to communicate with the terminal device 114 (and other terminal devices, as applicable), for example, via the network 112. Alternatively, the hub 124 may be disposed at the event 104 and/or at the payment network 108 (as indicated by the dotted lines in FIG. 1), or otherwise, yet still be in communication with the terminal device 114 (and other terminal devices, as applicable) via the network 112. The hub 124 is configured to expose a website or network-based application (not shown) as a manner of interacting with the user 116 (e.g., via a smartphone or other communication device associated with the user, whereby the user 116 may access the network-based application at his/her communication device; etc.). As such, the user 116 initially registers with the hub 124, via the network-based application, to enable transactions with the unattended vendor 102 at the event 104. In particular, the user 116 may provide a name, an address, a phone number, an email address, etc. to the hub 124 as part of such registration. Importantly, the user 116 also provides a payment account number (PAN) or other credential associated with the payment account issued to the user 116 by the issuer institution 110, etc., to the hub 124, either directly or indirectly (e.g., provisioned by a token service associated with the payment network 108, etc.). The user 116 further provides the hub 124 will a facial image (e.g., a selfie from a smartphone or other communication device, etc.) or other reference biometric specific to the user 116. The facial image (or other reference biometric) may then be used as a basis for comparison of subsequently received images of the user 116 in identifying the user 116 as registered to the hub 124.

In response to the information provided by the user 116, the hub 124 is configured to generate a user profile for the user 116 and store the same in memory associated therewith (e.g., in a Blockchain data structure in order to secure a digital identity associated with the user 116 as it may relate to the data provided by the user 116 during registration (e.g., in an immutable manner, etc.), etc.). In this manner, the user is registered to the hub 124. In various embodiments, as part of such registration (or as part of later updating the user profile for the user 116), the user 116 may also provide (e.g., as solicited by the hub 124, etc.), or may be assigned by the hub 124, a verifiable ID or passcode that may be employed by the user 116 (e.g., in addition to a pre-authorization request, etc.), to unlock the container 118 at the vendor 102 and access products within the container 118 when the products within the container (or at least some of the products in the container 118) require age verification to purchase (e.g., alcohol, etc.).

In turn, the hub 124 is configured to assign the user profile for the user 116 to a local group of vendors associated with the mailing address of the user 116 (e.g., at local stadiums, forums, etc. based on the user's address; etc.). Once assigned, the hub 124 is configured to provide the user profile, or part thereof, to one or more of the vendors associated with the local group of vendors, including the vendor 102 in this example. In so doing, the vendor 102, and more particularly, the terminal device 114, is configured to store the received user profile in memory as part of a local group of users (i.e., as part of a compilation of user profiles for users that are local to the vendor 102). The user profile is also retained in a global group of registered users at the hub 124. That said, the user 116 may subsequently access the profile and make updates or, potentially, request the profile be provided to other vendors not in the local group of vendors (e.g., when the user 116 is traveling, etc.). It should be appreciated that the user profile may be shuffled between groups of vendors and/or groups of users depending on transactions attributed to the user 116 or the user profile, as described below. It should also be appreciated that vendor profiles may further be compiled and stored for vendors in the system 100, including ten vendor 102. The vendor profile for the vendor 102 may include, for example, a listing of product(s) offered for sale at the vendor 102 and, potentially, reference images of the products, etc. The vendor profile is stored at the vendor 102, and specifically, within the terminal device 114, and also, potentially, the hub 124.

Given the above, once the user 116 is registered with the hub 124, the user 116 approaches the vendor 102 at the event 104, for example, to purchase one or more products included in the container 118. In response, the terminal device 114 is configured to capture, by the camera 122, an image of the user 116 (or other suitable biometric). The terminal 14 is configured to identify the user 116 from the captured image (or other biometric), and to identify the user profile associated with the user 116 in memory therein, i.e., in the local group of users. In identifying the user 116, the terminal device 114 may be configured to do so by a machine learning algorithm and/or artificial intelligence related to biometric recognition, including facial image recognition, fingerprint recognition, etc. However, upon capturing the image of the user 116, if the user 116 is not identified in the local group of users, the terminal device 114 is configured to interact with the hub 124 to identify the user based on the captured image (or biometric) from amongst the other user profiles stored at the hub 124, for instance, to determine if the user 116 is registered but included in a different group of users or in the global group of users. It should be understood that the multi-level identification of the user 116 (e.g., local, then global, etc.) may provide significant efficiencies as a local group could include one hundred or one thousand, or more registered users, while a global group of users may include hundreds of thousands of registered users, thereby reducing comparisons involved in identification when a user is recognized from the local group.

Once the user 116 is identified, the terminal device 114 is configured to compile a pre-authorization request for a transaction by the user 116, directed to the user's payment account (as included in the user profile for the user 116). The pre-authorization request may include an amount reasonable in view of the products offered for sale by the vendor 102 (e.g., $100, $200, $350, etc.), but may not be specific to any particular product. The terminal device 114 is configured to then submit the pre-authorization request to the acquirer institution 106, which is associated with the vendor 102 in that the acquirer institution 106 may issue an account to the vendor 102 for use in receiving funds for products purchased from the vendor 102. In turn, the acquirer institution 106 is configured to transmit the pre-authorization request to the issuer institution 110 (associated with the use's account), via the payment network 108 (along path A in FIG. 1). Upon receipt of the pre-authorization request, the issuer institution 110 is configured to approve or decline the request. And, in response, the issuer institution 110 is configured to compile a pre-authorization reply, indicating the same, and transmit the pre-authorization reply to back to the terminal device 114, via the payment network 108 and the acquirer institution 106.

Upon receipt of the pre-authorization reply, if declined, the terminal device 114 is configured to indicate the same to the user 116. However, if approved, the terminal device 114 is configured to toggle or otherwise manipulate the locking mechanism 120 to allow access to the container 118. The user 116 is then permitted to open a door, cover, etc. (or the door, cover, etc. is configured to automatically open), and to pull one or more products from the container 118 before closing the door, cover, etc. (or before the door, cover, etc. automatically closes, etc.). During the user's actions, or when the cover, door, etc., is closed, the terminal device 114 is configured to capture images of the product(s) pulled from the container 118 (via the camera 122), and to toggle or otherwise manipulate the locking mechanism 120 to again secure the container 118. The terminal device 114 is configured to then identify the product(s), by type and count, removed (or selected) by the user 116 based on the captured images (and/or other suitable means (e.g., based on RFID tags associated with the products, computer readable indicia scanned by the vendor 102 as the products are removed, weight sensors associated with the container 118, etc.) and to display a price for the transaction to the user 116.

In turn, the terminal device 114 is configured to compile a payment request for the products removed from the container 118 (again using the payment account credential from the user profile for the user 116), including the total amount for the product(s), and to submit the same (e.g., as an authorization request, etc.) to the to the acquirer institution 106. The acquirer institution 106 is configured to transmit the request to the issuer institution 110, via the payment network 108 (again along path A in FIG. 1). And, the issuer institution 110 is configured to record the transaction to the payment account of the user 116, whereby the credit and/or balance associated with the payment account is reduced by the amount of the transaction. Here, the pre-authorization reply generated and transmitted by the issuer institution 110 is the approval for the transaction. As such, in this example, a further authorization reply (in response to the transaction request (or authorization request)) may not be generated by the issuer institution 110 and/or transmitted by the issuer institution 110 back to the terminal device 114 of the vendor 102. Alternatively, the issuer institution 110 may generate an authorization reply (in response to the transaction request (or authorization request)), and transmit the same back to the terminal device 114 of the vendor 102, whereby the terminal device 114 may then display the approval/confirmation to the user 116 in connection with completing the transaction/interaction (e.g., as generally described in method 300, etc.). The transaction may then require, optionally, an input from the user 116 at the terminal device 114, or otherwise, to proceed in the transaction. That said, the user 116 may be provided an option at registration for the pre-authorization reply, when associated with approval, to operate as the approval for the subsequent transaction, or an option to always show a confirmation on purchase (whereby a subsequent authorization request for the transaction will result in an authorization reply authorizing/confirming the transaction, etc.). In various embodiments, the option for the pre-authorization reply to operate as the approval for the subsequent transaction may be a default setting for the user 116 in the user profile, etc.

In addition to the above, the terminal device 114 is configured to notify the hub 124 of the transaction, whereby the hub 124 is configured to compile transaction data for transaction by the user and store the same in the user profile for the user 116 (such that the user profile may include a transaction record for the user 116 for transactions performed at the vendor 102 and/or at unattended vendors in general). The hub 124 is also configured to compile the transaction data for the transaction with transaction data for other registered users interacting with the vendor 102 (whereby the compiled data may then be particular to transactions at the vendor 102), as well as to other groups of users and/or vendors (whereby the compiled data may then further be particular to one or more groups of vendors, users, etc.). Based on the transaction and other transactions by the user 116, the hub 124 is configured to adjust the groups to which the user profile for the user 116 is assigned, as needed. For example, where the user 116 lives in region A, but attends multiple events in region B, the use profile for the user 116 may be added to the local group for region B to improve the efficiency of recognizing the user 116 at events in region B. Likewise, where the user 116 lives in region A, but attends only events in region B, the use profile for the user 116 may be removed from the local group for region A to improve the efficiency of recognizing other users at events in region A. In this manner, the assignment of the user profile to groups over time may be based on local transactions and the frequency of the transactions at the respective vendors.

With that said, alternatively in the system 100, when a user attempts to interact with the vendor 102 but is not registered to the hub 124, the user is not recognized at either the local level or the global level. As such, the terminal device 114 is configured to instructed the user to register with the hub 124 and/or the vendor 102 in order to further interact with the vendor 102.

Figure 2:
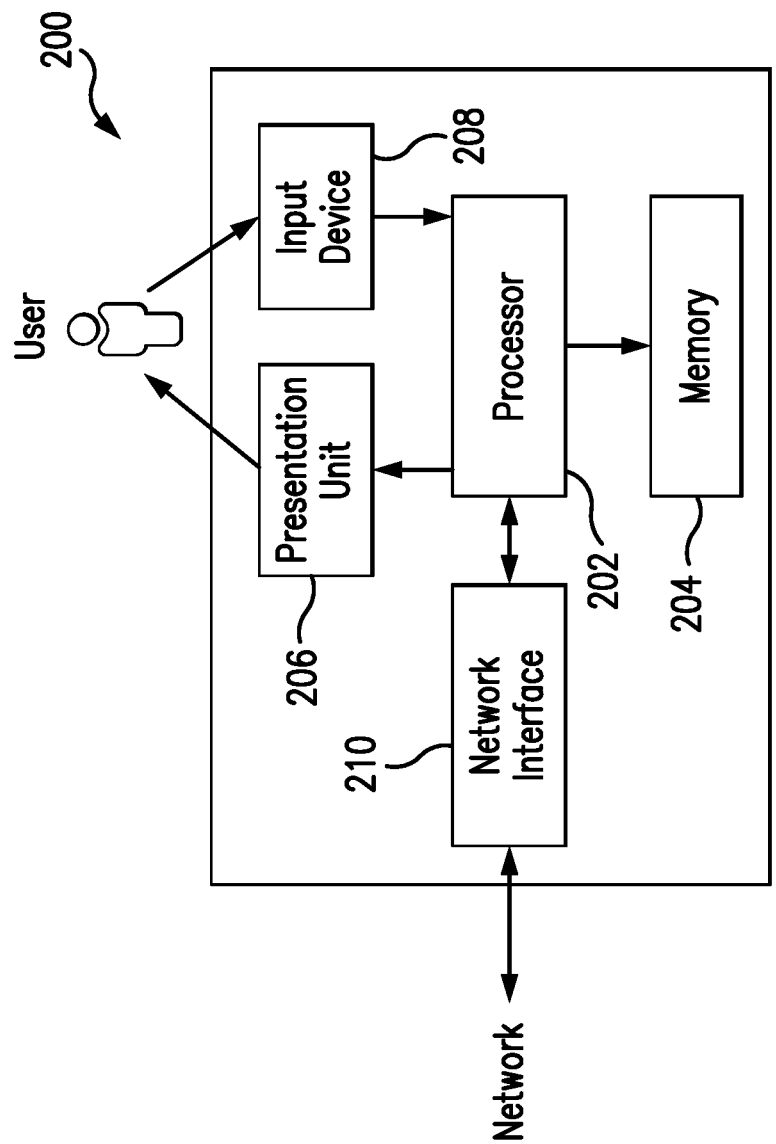
FIG. 2 is a block diagram of a computing device that may be used in the exemplary system of FIG. 1.

FIG. 2 illustrates an exemplary computing device 200 that can be used in the system 100 of FIG. 1. The computing device 200 may include, for example, one or more servers, workstations, personal computers, tablets, laptops, smartphones, point-of-sale (POS) terminals, etc. In addition, the computing device 200 may include a single computing device, or it may include multiple computing devices located in close proximity or distributed over a geographic region, so long as the computing devices are specifically configured to function as described herein. However, the system 100 should not be considered to be limited to the computing device 200, as described below, as different computing devices and/or arrangements of computing devices may be used. In addition, different components and/or arrangements of components may be used in other computing devices.

In the exemplary embodiment of FIG. 1, each of the terminal device 114, the camera 122, the acquirer institution 106, the payment network 108, and the issuer institution 110 are implemented in and/or include a computing device generally consistent with the computing device 200, coupled to (and in communication with) the network 112. Further, and as indicated above, the computing device 200 associated with each of these parts of the system 100, for example, may include a single computing device, or multiple computing devices located in close proximity or distributed over a geographic region, again so long as the computing devices are specifically configured to function as described herein.

The exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. In connection therewith, the memory 204 may be configured to store, without limitation, transaction data, vendor profiles, user profiles, payment account credentials, reference biometrics, vendor product/pricing listings, and/or other types of data suitable for use as described herein.

Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein (e.g., one or more of the operations of method 300, etc.), whereby the computing device 200 may be transformed into a special-purpose computing device (as indicated below). It should be appreciated that the memory 204 may include a variety of different memories, each implemented in one or more of the functions or processes described herein.

In the exemplary embodiment, the computing device 200 includes a presentation unit 206 that is coupled to (and that is in communication with) the processor 202 (however, it should be appreciated that the computing device 200 could include output devices other than the presentation unit 206, etc. in other embodiments). The presentation unit 206 outputs/presents information (e.g., approvals or declines, etc.), for example, visually, audibly, etc., to a user of the computing device 200, such as, for example, the user 116, etc. It should be further appreciated that various interfaces (e.g., as defined by network-based applications, etc.) may be displayed at computing device 200, and in particular at presentation unit 206, to display such information. The presentation unit 206 may include, without limitation, a liquid crystal display (LCD), a light-emitting diode (LED) display, an LED, an organic LED (OLED) display, an "electronic ink" display, speakers, etc. In some embodiments, presentation unit 206 includes multiple devices.

The computing device 200 also includes an input device 208 that receives inputs from the user (i.e., user inputs), etc. The input device 208 is coupled to (and is in communication with) the processor 202 and may include, for example, a keyboard, a pointing device, a mouse, a button, a stylus, a touch sensitive panel (e.g., a touch pad or a touch screen, etc.), another computing device, and/or an audio input device. Further, in various exemplary embodiments, a touch screen, such as that included in a tablet, a smartphone, or similar device, may behave as both the presentation unit 206 and the input device 208.

In addition, the illustrated computing device 200 further includes a network interface 210 coupled to (and in communication with) the processor 202 and the memory 204. The network interface 210 may include, without limitation, a wired network adapter, a wireless network adapter, a mobile network adapter, or other device capable of communicating to/with one or more different networks, including the network 112. Further, in some exemplary embodiments, the computing device 200 includes the processor 202 and one or more network interfaces (including the network interface 210) incorporated into or with the processor 202.

Figure 3:
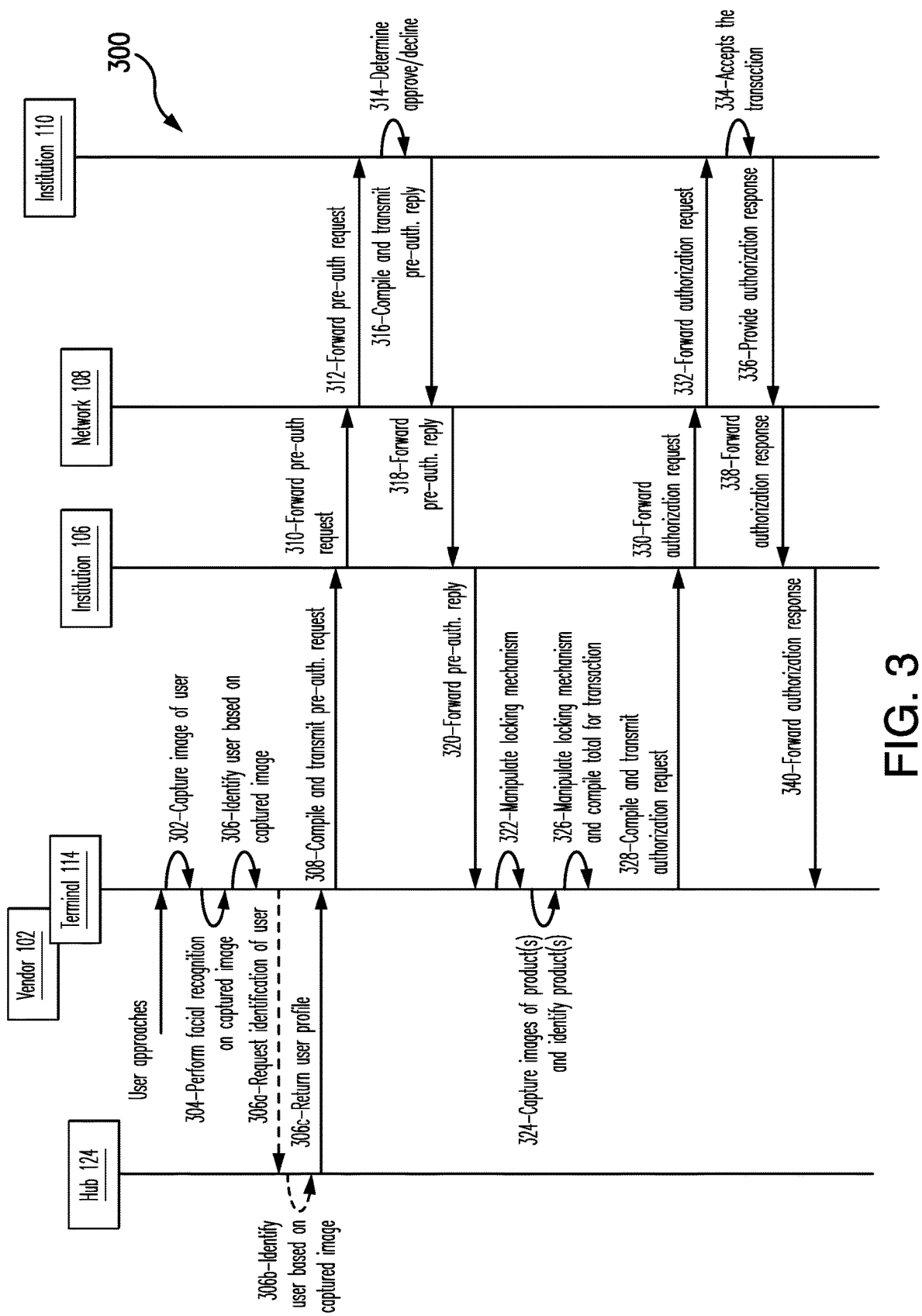
FIG. 3 is an exemplary method, which may be implemented in the system of FIG. 1, for use in facilitating a transaction for the purchase of a product by a user through an unattended vendor, where the transaction is funded by a payment account associated with the user.

FIG. 3 illustrates an exemplary method 300 for use in facilitating a transaction for the purchase of a product through an unattended vendor (or unattended terminal device associated with the vendor). The method 300 is described with reference to the system 100, and in particular to the terminal device 114, and with further reference to the computing device 200. The methods described herein (including the method 300), however, should not be considered to be limited to the system 100, or the computing device 200.

Likewise, the systems and devices herein should not be considered to be limited to the method 300.

At the outset in the method 300, the user 300 is registered with the hub 124, as described above with reference to FIG. 1. As such, a user profile for the user 116 is stored at the hub 124 and/or the terminal device 114, and includes, at least, a biometric of the user 116 (e.g., a facial image of the user 116, etc.) and a payment account credential for the payment account issued by the issuer institution 110 to the user 116.

Consequently in the method 300, when the user 116 approaches the vendor 102, the terminal device 114 captures, at 302, one or more images of the user 116, with the camera 122. The images are generally facial images, but may be otherwise (e.g., the camera 122 and/or one or more other biometric sensors may capture fingerprint data for the user 116, etc.).

Upon receipt of the image(s) of the user 116, the terminal device 114 performs, at 304, facial recognition on the captured image relative to reference images associated with multiple user profiles assigned to a local group for the vendor 102 (and stored locally in memory 204 at the terminal device 114, etc.). The facial recognition may be based on a model specific to the location of the vendor 102 (e.g., at the event 104, within a region of the event 104, etc.), whereby the model is based on data specific to the location of the vendor 102 (e.g., whereby the model is based on users that have purchased products from the vendor 102 previously, transaction data in general related to the purchase of products from the vendor 102, users that have purchased products from any vendors at the event 104, users that have purchased products at events within a geographic region including the event 104 (e.g., within a same area code, a same zip code, a same city, etc.), etc.). In addition, the model may be based on a list of local users with a high probability of usage of the vendor 102 (e.g., based on prior purchases by the users at the vendor 102, or at similar vendors, or involving similar products offered for sale by the vendor 102, or at the event 104 or at similar events, etc.). It should be appreciated that the model may be determined iteratively over time to enable the model to act efficiently within the terminal device 114 (e.g., as consistent with the processing capabilities of the terminal device 114, etc.). It should further be appreciated that the model may be updated and/or generated at the hub 124 and pulled by, or pushed to, the terminal device 114 at one or more intervals (regular or irregular).

And, based on the facial recognition, the terminal device 114 identifies, at 306, the user 116 (and his/her corresponding user profile) based on the captured image. This is generally limited to when the user 116 is associated with one of the user profiles in the local group for the vendor 102 (and stored in the memory 204 at the terminal device 114, etc.). Conversely, when the user 116 is not associated with one of the user profiles included in the local group, the terminal device 114 optionally requests, at 306a (as indicted by the dotted lines in FIG. 3), identification of the user 116 from the hub 124. Upon receipt of the request, the hub 124 performs facial recognition, in this example, for the captured image against a group of registered user profiles, for example, the global group, etc. In this manner, the hub 124 identifies, at 306b, the user 116 based on the captured image. The hub 124 then may retrieve the user profile, or part thereof, from a data structure (e.g., a Blockchain data structure, etc.), and then, at 306c, returns the user profile, or a part thereof, for the identified user 116 to the terminal device 114.

Regardless of whether the user 116 is identified locally by the terminal device 114, or by the hub 124, the terminal device 114 next compiles and transmits, at 308, a pre-authorization request for a transaction between the user 116 and the vendor 102 to the acquirer institution 106. The pre-authorization request may include, without limitation, the payment account credential for the user 116 (as obtained from the user profile for the user 116), a terminal ID for the terminal device 114, vendor data for the vendor 102 (e.g., a name, an address, etc.), acquirer data for the acquirer institution 106, etc., and also an amount reasonably necessary for the transaction by the user 116 at the vendor 102 (e.g., $100, $200, $350, etc.), etc. It should be appreciated that prior to the pre-authorization request, the user 116 may be invited, at the terminal device 114, to confirm the user profile for the user 116 and/or the use of a credential included in the user profile, to purchase products from the vendor 102. In connection therewith, the user profile may further indicate age information associated with the user 116, whereby the vendor 102 may permit more or less products to be available for purchase (e.g., an alcohol purchase for users of legal age, etc.).

The acquirer institution 106, in turn, forwards the pre-authorization request to the payment network 108, at 310, and the payment network 108 forwards, at 312, the pre-authorization request to the issuer institution 110. Upon receipt, the issuer institution 110 determines, at 314, whether to approve or to decline the pre-authorization request. The issuer institution 110 then compiles and transmits, at 316, a pre-authorization reply, indicating the approval or decline of the request, back to the payment network 108. The payment network 108 forwards, at 318, the pre-authorization reply to the acquirer institution 106 and, in turn, the acquirer institution 106 forwards, at 320 the pre-authorization reply to the terminal device 114.

Upon receipt of the pre-authorization reply, if declined, the terminal device 114 is configured to indicate the same to the user 116 at the presentation unit 206 of the terminal device 114. And, the interaction is generally terminated.

However, if the pre-authorization request is approved, the terminal device 114 may display the approval to the user 116 in connection with data related to the approval (e.g., an authorized amount, etc.) and manipulates, at 322, the locking mechanism 120 at the container 118 to allow the user 116 to access the container 118. The user 116 is then permitted to open a door, cover, etc., and to pull (or remove or otherwise access) one or more products from the container 118 before closing the door, cover, etc. During the user's actions, or when the cover, door, etc., is closed, the terminal device 114 captures images of the product(s), at 324, pulled from the container 118. The terminal device 114 may capture one image or multiple different images via the camera 122 (which may include multiple cameras), and identifies the products being pulled from the container 118 by the user 116 based on the captured image(s). The product(s) may be identified based on image recognition in combination with a product list included in the terminal device 114 for the vendor 102 (e.g., in memory 204, etc.). That is, for example, rather than identify the product in the abstract, the terminal device 114, in this example, is tasked with identifying the products as one of the particular products offered for sale by the vendor 102 (or more specifically, available from the vendor 102 at the container 118). After the user 116 has completed pulling products from the container 118, the terminal device 114 manipulates the locking mechanism 120 to re-secure access to the container 118 and compiles, at 326, a total amount for purchase of the identified products in the transaction. The terminal device 114 may then display a price for the transaction to the user 116.

While only the one container 118 and one locking mechanism 120 is shown in the system 100 (and described in the method 300), it should be appreciated that the container 118 may be associated with multiple locking mechanisms and/or the vendor 102 may be associated with multiple containers each having a locking mechanism, whereby the terminal device 114 may be configured to manipulate select ones of the locking mechanisms based on the approval and based on various additional constraints. For example, one locking mechanism may be manipulated for the user 116 following pre-authorization when the user 116 is less than 21 years old (thereby permitting the user 116 to remove products from the container associated with the manipulated locking mechanism), while the same locking mechanism and another locking mechanism may manipulated for the user 116 following pre-authorization when the user is 21 years old (thereby permitting the user 116 to remove products from the container that are not age restricted and products from the container that are age restricted). It should be appreciated at other constraints may be associated with manipulating locking mechanism at the vendor 102 in other embodiments (e.g., a reward level, an amount for which the user 116 is pre-authorized, etc.).

Then in the method 300, at 328, the terminal device 114 compiles an authorization request for the transaction (using the payment account credential from the user profile for the user 116), including the total amount for the product(s) and the payment account credential for the user's payment account, and transmits the authorization request to the acquirer institution 106. As above, the acquirer institution 106, in turn, forwards the authorization request to the payment network 108, at 330, and the payment network 108 forwards, at 332, the authorization request to the issuer institution 110. The issuer institution 110 accepts, at 334, the transaction, for example, based on the pre-authorization request. The issuer institution 110 in turn compiles and transmits, at 336, an authorization reply for the transaction back to the payment network 108. And, the payment network 108 forwards, at 338, the authorization reply to the acquirer institution 106 and, in turn, the acquirer institution 106 forwards, at 340 the authorization reply to the terminal device 114 (e.g., for storage in memory 204, etc.).

In addition to the above, the terminal device 114 also notifies the hub 124 of the transaction, whereby the hub 124 is permitted to compile transaction data for the transaction, together with other transactions by registered users to vendors as generally described above. Based on the transaction and other transactions, then, the hub 124 may adjust the groups to which the user profile for the user 116 is assigned, as needed.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transforms a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by one or more of: (a) capturing, by a terminal associated with the unattended vendor, a facial image of a user, the user associated with a user profile including a credential associated with an account for the user; (b) identifying, by the terminal, the user based on the captured facial image of the user and a model specific to a location of the terminal; (c) compiling, by the terminal, a pre-authorization request including the credential associated with the account for the user and a first amount, wherein the first amount is disassociated with an input from the user; (d) upon receipt of an approval in response to the pre-authorization request, manipulating, by the terminal, a locking mechanism coupled to a container associated with the unattended vendor to permit access by the user to products included in the container; (e) capturing, by the terminal, at least one image of at least one product removed, by the user, from the container; (f) identifying, by the terminal, the at least one product based on the at least one image; and (g) compiling, by the terminal, an authorization request including the credential associated with the account for the user and a second amount, wherein the second amount is based on a price associated with the identified at least one product, whereby a transaction for the at least one product is funded by the account.

As will be appreciated based on the foregoing specification, the above-described embodiments of the disclosure may be implemented using computer programming or engineering techniques including computer software, firmware, hardware or any combination or subset thereof, wherein the technical effect may be achieved by one or more of the steps recited in the claims.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "coupled to," "associated with," "included with," or "in communication with" another element or layer, it may be directly on, engaged, connected or coupled to, associated with, or in communication with the other element or layer, or intervening elements or layers may be present. As used herein, the term "and/or" and the phrase "at least one of" includes any and all combinations of one or more of the associated listed items.

In addition, as used herein, a product may include a service, a good, etc.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in facilitating a transaction for a purchase of a product by a user through an unattended vendor, the method comprising:
    in response to a user approaching a terminal associated with the unattended vendor, capturing, by the terminal, a facial image of the user;
    searching, by the terminal, for the user, based on the captured facial image of the user and a model specific to a location of the terminal, the model based on historic transaction data involving multiple users and specific to a region including the location of the terminal;
    based on the search not finding the user:
        transmitting, by the terminal, a request for a user profile associated with the user to a hub computing device, wherein the request includes the captured facial image of the user; and
        receiving, from the hub computing device, the user profile, the user profile including a credential associated with an account of the user;
    in response to receiving the user profile, compiling, by the terminal, a pre-authorization request including the credential associated with the account for the user and a first amount, wherein the first amount is disassociated with an input from the user;
    transmitting, by the terminal, the pre-authorization request to an issuer associated with the account of the user, whereby the issuer is permitted to approve or decline the pre-authorization request;
    receiving an approval of the pre-authorization request from the issuer associated with the account of the user;
    based on the approval of the pre-authorization request:
        displaying, by the terminal, a pre-authorization success message to the user; and
        manipulating, by the terminal, a locking mechanism coupled to a container associated with the unattended vendor to permit access by the user to products included in the container;
    capturing, by the terminal, at least one image of at least one product removed, by the user, from the container;
    identifying, by the terminal, the at least one product based on the at least one image;
    compiling, by the terminal, an authorization request including the credential associated with the account for the user and a second amount, wherein the second amount is based on a price associated with the identified at least one product, whereby a transaction for the at least one product is funded by the account; and
    displaying, by the terminal, the second amount to the user.

2. The computer-implemented method of claim 1, wherein the model is associated with a plurality of user profiles included in a local group of users for the terminal.

3. The computer-implemented method of claim 1, wherein the at least one product removed, by the user, from the container, is not selected by the user prior to the user removing the at least one product from the container.

4. The computer-implemented method of claim 1, wherein the at least one product removed, by the user, from the container, is not identified to the terminal prior to the user removing the at least one product from the container.

5. The computer-implemented method of claim 1, further comprising manipulating, by the terminal, the locking mechanism to inhibit access to the products included in the container after identifying the at least one product.

6. The computer-implemented method of claim 1, further comprising registering, by the hub computing device, the user prior to capturing the facial image of the user, whereby the user profile for the user is stored; and
    transmitting, by the hub computing device, the user profile to the terminal.

7. The computer-implemented method of claim 1, further comprising transmitting the authorization request to the issuer.

8. The computer-implemented method of claim 1, further comprising retrieving, by the terminal, the user profile for the user from memory in communication with the terminal in response to identifying the user based on the captured facial image.

9. The computer-implemented method of claim 1, further comprising identifying, by the terminal, in response to receipt of the approval of the pre-authorization request, at least one restriction associated with the user profile; and
    based on the at least one restriction, manipulating, by the terminal, the locking mechanism to inhibit access to the products included in the container, thereby denying access by the user to products included in the container associated with the restriction.

10. A system for use in facilitating a transaction for a purchase of a product by a user at an unattended vendor, the system comprising a terminal computing device associated with the unattended vendor, the terminal computing device configured to:

in response to a user approaching a terminal of the unattended vendor, capture a biometric for the user at the terminal of the unattended vendor;

search for the user based on the captured biometric of the user and a model specific to a location of the terminal, wherein the model is based on historic transaction data involving multiple users and specific to a region including the location of the terminal;

based on the search not finding the user:
  transmit a request, to a hub computing device, for a user profile associated with the user, wherein the request includes the captured biometric of the user; and
  receive, from the hub computing device, the user profile including a credential associated with an account of the user;

in response to reception of the user profile, compile a pre-authorization request including the credential associated with the account for the user and a first amount, wherein the first amount is disassociated with an input from the user;

transmit the pre-authorization request to an issuer associated with the account of the user, whereby the issuer is permitted to approve or decline the pre-authorization request;

receive an approval of the pre-authorization request from the issuer associated with the account of the user;

based on the approval of the pre-authorization request:
  manipulate a locking mechanism coupled to a container associated with the unattended vendor to permit access by the user to products included in the container; and
  display a pre-authorization success message to the user;

capture at least one image of at least one product removed, by the user, from the container;

identify the at least one product based on the at least one image;

compile an authorization request including the credential associated with the account for the user and a second amount, wherein the second amount is based on a price associated with the identified at least one product, whereby a transaction for the at least one product is funded by the account; and display the second amount to the user.

11. The system of claim 10, wherein the terminal computing device is further configured to manipulate the locking mechanism to inhibit access to the products included in the container after identifying the at least one product.

12. The system of claim 11, further comprising the container and the locking mechanism coupled to the container, wherein the container is disposed at a location of the unattended vendor and wherein the terminal computing device is disposed adjacent the container.

13. The system of claim 12, wherein the biometric for the user includes an image of the user;
  wherein the system further comprises a camera disposed adjacent the container, the camera configured to capture the image of the user at the unattended vendor; and
  wherein the terminal computing device is configured to identify the user based on the captured image of the user.

14. The system of claim 10, further comprising the hub computing device in communication with the terminal computing device, wherein the hub computing device is configured to:
  compile the user profile for the user, prior to capture of the biometric for the user at the unattended vendor; and
  transmit the user profile to the terminal computing device.

15. The system of claim 14, wherein the model is associated with a plurality of user profiles included in a local group of users for the terminal computing device;
  wherein the hub computing device is further configured, when the search does not find the user, to:
    identify the user based on a plurality of user profiles included in a global group of users and stored at the hub; and
    transmit at least a part of the user profile for the user to the terminal; and
  wherein the terminal computing device is configured, in connection with compiling the pre-authorization request, to compile the pre-authorization request based on the received user profile for the user.

16. The system of claim 10, further comprising identify, in response to receipt of the approval of the pre-authorization request, at least one restriction associated with the user profile; and
  based on the at least one restriction, manipulate the locking mechanism to inhibit access to the products included in the container, thereby denying access by the user to products included in the container associated with the restriction.

17. A non-transitory computer-readable storage medium including executable instructions for facilitating a transaction for a purchase of a product by a user at an unattended vendor, which when executed by at least one processor of a terminal computing device at the unattended vendor, cause the at least one processor to:
  in response to a user approaching a terminal associated with the unattended vendor, capture a biometric for the user at terminal associated with the unattended vendor;
  search for the user based on the captured biometric of the user and a model specific to a location of the terminal, the model being based on historic transaction data involving multiple users and specific to a region including the location of the terminal;
  based on the search not finding the user:
    transmit a request, to a hub computing device, for a user profile associated with the user, wherein the request includes the captured biometric of the user; and
    receive, from the hub computing device, the user profile including a credential associated with an account of the user;
  in response to reception of the user profile, compile a pre-authorization request including the credential associated with the account for the user and a first amount, wherein the first amount is disassociated with an input from the user;
  transmit the pre-authorization request to an issuer associated with the account of the user, whereby the issuer is permitted to approve or decline the pre-authorization request;
  receive an approval of the pre-authorization request from the issuer associated with the account of the user;
  based on the approval of pre-authorization request:
    manipulate a locking mechanism coupled to a container associated with the unattended vendor to permit access by the user to products included in the container; and
    display a pre-authorization success message to the user;
  capture at least one image of at least one product removed, by the user, from the container;
  identify the at least one product based on the at least one image;
  compile an authorization request including the credential associated with the account for the user and a second amount, wherein the second amount is based on a price associated with the identified at least one product, whereby a transaction for the at least one product is funded by the account; and display the second amount to the user.

18. The non-transitory computer-readable storage medium of claim 17, wherein the executable instructions, when executed by the at least one processor, further cause the at least one processor to:

transmit the authorization request to the issuer, following the receipt of the approval of the pre-authorization request.

19. The non-transitory computer-readable storage medium of claim 17, wherein the model is associated with a plurality of user profiles included in a local group of users for the terminal;

wherein the executable instructions, when executed by the at least one processor, further cause the at least one processor, when the search does not find the user, to receive, from a hub computing device associated with the terminal computing device, at least part of a user profile for the user from a plurality of user profiles included in a global group of users and stored at the hub computing device; and wherein the executable instructions, when executed by the at least one processor in connection with compiling the pre-authorization request, cause the at least one processor to compile the pre-authorization request based on the received user profile for the user.

20. The non-transitory computer-readable storage medium of claim 17, wherein the at least one product removed, by the user, from the container is not selected by the user prior to the user removing the at least one product from the container and is not identified to the terminal computing device prior to the user removing the at least one product from the container.

* * * * *